United States Patent [19]

Wasko

[11] 3,955,638

[45] May 11, 1976

[54] PRECISION BALANCE

[75] Inventor: Bernard Wasko, Bronxville, N.Y.

[73] Assignee: Voland Corporation, New Rochelle, N.Y.

[22] Filed: Mar. 5, 1975

[21] Appl. No.: 555,578

[52] U.S. Cl. .............................. 177/212; 177/229
[51] Int. Cl.² ......................................... G01G 1/38
[58] Field of Search ............ 177/164, 170, 171, 210, 177/212, 225, 229

[56] References Cited
UNITED STATES PATENTS

| | | | |
|---|---|---|---|
| 3,347,328 | 10/1967 | Schieser et al. | 177/229 |
| 3,387,679 | 6/1968 | Giulie et al. | 177/229 |
| 3,443,653 | 5/1969 | Marshall | 177/229 |
| 3,677,557 | 7/1972 | Baumgartner | 177/188 |
| 3,688,854 | 9/1972 | Strobel | 177/212 |
| 3,799,281 | 3/1974 | Wernitz | 177/212 |
| 3,816,156 | 6/1974 | Baumann | 177/212 |

Primary Examiner—L. T. Hix
Assistant Examiner—Vit W. Miska
Attorney, Agent, or Firm—Walter Kruger

[57] ABSTRACT

A self-restoring precision balance which is essentially non-deflecting. Initially, the balance is unbalanced by an amount approximately equal to one half its weighing range, and the electrically energized restoring system is so arranged that a restoring force, is exerted in one direction to maintain the beam at a null condition at loads less than about one half scale, and is exerted in the opposite direction to maintain the beam at a null condition at loads greater than about one half scale. Heating in the restoring transducer is therefore reduced by a factor of 4. A unique arrangement of cross-flexures and a stabilizing band which remains always in tension, is used without affecting the accuracy of the balance, because of the small range of movement of the self-restoring system. A unique two coil electro-magnetic restoring arrangement provides for linearity at low cost.

19 Claims, 4 Drawing Figures

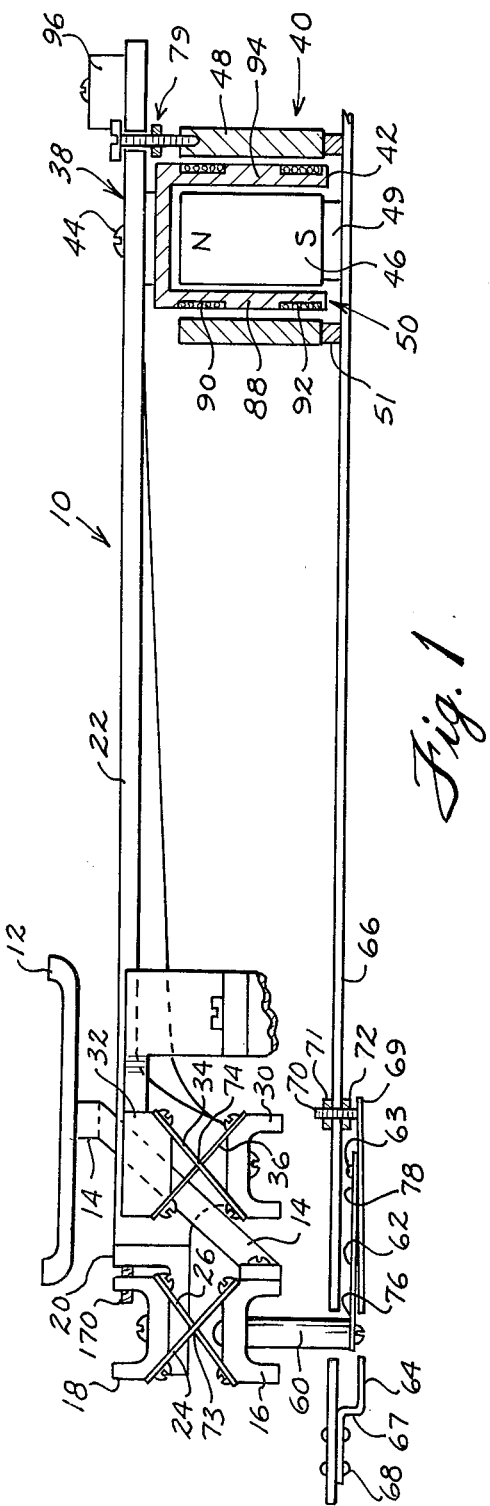
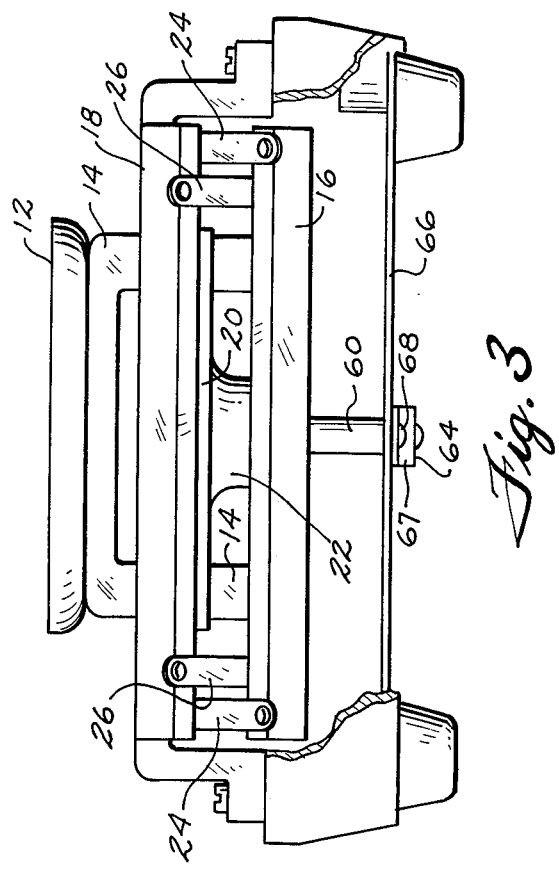

PRECISION BALANCE

This invention relates to an automatic top loading precision balance which is essentially non-deflecting, so that the balance has essentially no moving parts.

More specifically, the invention relates to an automatic non-deflecting electronic read out balance in which the extent of deflection of a top loading pan and its associated beam is so slight, that such movement is not detectable during normal operation of the balance.

Automatic weighing systems are known in which displacement of a beam from a null position is sensed, an electrical signal is generated in response to the sensed displacement, and circuitry is provided to generate a restoring force which returns the moveable element, usually a beam, to a null position. Typically, the restoring devices are electro-magnetic, and the restoring current or its voltage is measured to indicate the weight of the weighed object.

In such balances inaccuracies frequently arise as a result of heating due to the restoring current, especially where relatively large loads are weighed, for example, on the order of several thousands grams. Such heating causes inaccuracy, usually as a result of thermal expansion with resultant variation of dimensions of parts of the balance as well as heating of the magnet which change the magnetic force, where the restoring device is electro-magnetic. In the past, various compensation devices have been used to compensate for the affects of heating in restoring balances. In accordance with the present invention, heating is reduced by a factor of four as compared to prior balances of this type, so no compensation is required.

Another problem encountered in such electro-magnetically restoring balances resides in the restoring force-current characteristics of the rebalancing system. In the past, a true linear relationship between force and current of a rebalancing electro-magnetic system has been exceedingly difficult to obtain. In accordance with another aspect of this invention, an electro-magnetic load compensation or restoring arrangement is provided in which a true linear relationship, within the range of the force required is relatively easy to obtain, and is quite inexpensive to construct.

Other problems encountered with prior balances are the requirement for relatively precise leveling of the balance, the requirement for expensive and delicate knife edges and bearings or complex adjusting devices to obtain accuracy, and in the case of cross-flexure pivots, inaccuracies introduced as a result of spring hysteresis. Additional inaccuracies frequently occur as a result of eccentric pan loading in planes both transverse to and parallel with the vertical swing plane of the beam.

In accordance with this invention the above problems and inaccuracies are minimized to the extent that reasonably good accuracy as high as about 1 part in 100,000 can be obtained in the environment of a relatively inexpensive balance.

In accordance with the invention, the effects of heating, even at high load measurements, are essentially eliminated by eliminating a major cause of the heating, namely, the power required to restore the balance to its null condition. In the balance of this invention, the beam is initially unbalanced by an amount approximately equal to one half of its full scale weighing capacity, the restoring transducer system is so arranged that a restoring force is exerted in one direction to maintain the beam at a null condition at loads less than about one half scale, and a force is exerted in the opposite direction to maintain the beam at a null condition at loads greater than about one half scale. At least one transducer is energized with current or voltage of one polarity to maintain the beam at a null condition at loads less than one half scale, and is energized with a current or voltage of the other, or reverse polarity to maintain the beam at a null condition at loads greater than about half scale. As a result of such bi-polar energization of the restoring transducer, only one fourth the heating encountered in prior balances occurs, and as a result, it is possible to weigh 4 times the weight weighable by prior balances without encountering adverse heating effects. In the preferred arrangement, the transducer is electro-magnetic.

Even though the balance of this invention has only very minute deflection as a result of the restoring system, it is necessary for the restoring electro-magnetic system to have a linear force-current characteristic in the range of such deflection. Linearity, in the past, has been quite difficult to obtain, because it is virtually impossible to establish a truly linear magnetic field, at reasonable expense, and it is also quite difficult to construct a coil with linear magnetic characteristics at reasonable expense. Such problems are avoided in accordance with another feature of the present invention by using two coils, each of which can be non-linear in the range of movement, but in which the non-linearities apparently cancel each other so that the force-current characteristics of the restoring system are linear in the required range of movement.

By virtue of the exceedingly small deflection of the beam required to operate the restoring system, the balance of this invention uses a parallelogram linkage arrangement with pivots of a type which have not previously been usable with accuracy. Two of the pivots can be of the cross-flexure type, and the other two pivots, which are essentially imaginary, are comprised of a single stabilizing or tension band with its ends fixed. The stabilizing band and the beam and its pivots are so arranged with respect to the pan and its size, that the stabilizing band remains in tension regardless of the position of weight on the pan, and the affects of eccentric loading transverse to the pivot axes are thus avoided in the manner of a Roberval balance linkage. Inaccuracies as a result of eccentric loading of the pan in a direction parallel to the pivot axes of the cross-flexure pivots are avoided by using two pairs of cross-flexures to define each pivot axis.

In accordance with a preferred embodiment of this invention, there is provided a self-restoring precision balance with a photo-transistor sensing arrangement to determine the null position of the balance, restoring means in the form of an electro-magnetic transducer, and essentially linear servo ciricuitry. As a result of the linearity of the circuitry coupled with the linear force-current characteristics of the electro-magnetic restoring transducer, excellent accuracy is attained. The minute deflection of the system permits use of cross-flexure pivots and a stabilizing band. Advantageously, the read out of the balance is numerical, in the form of a digital display.

Numerous other features and advantages of the invention will become apparent with reference to the drawings which form a part of the specification.

BRIEF DESCRIPTION OF THE DRAWINGS

FIG. 1 is a side view in elevation of the balance with portions removed for illustration;

FIG. 3 is a left hand end view of the balance; and

Figure 2:
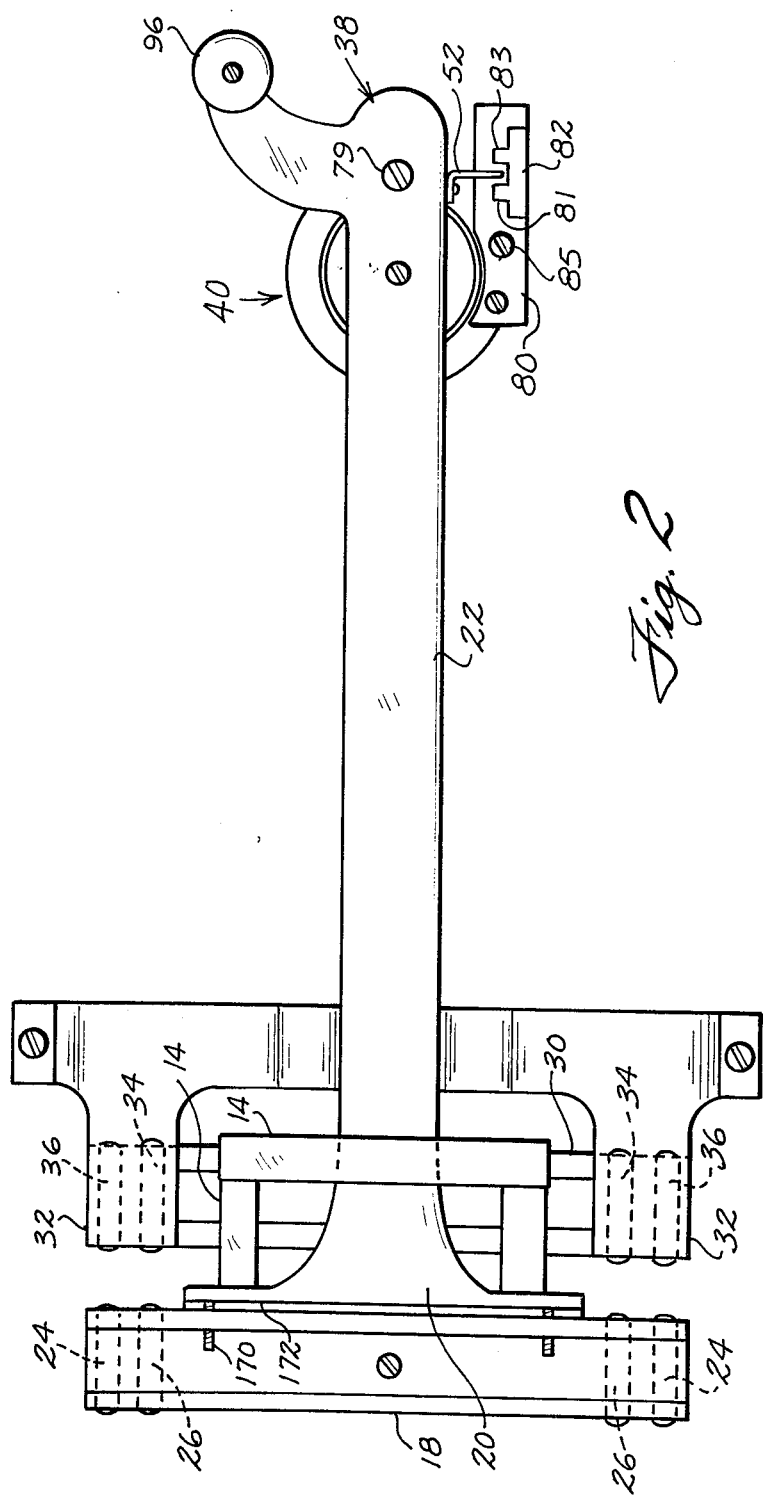
FIG. 2 is a top plan view, with portions removed, of the balance of FIG. 1.
Figure 4:
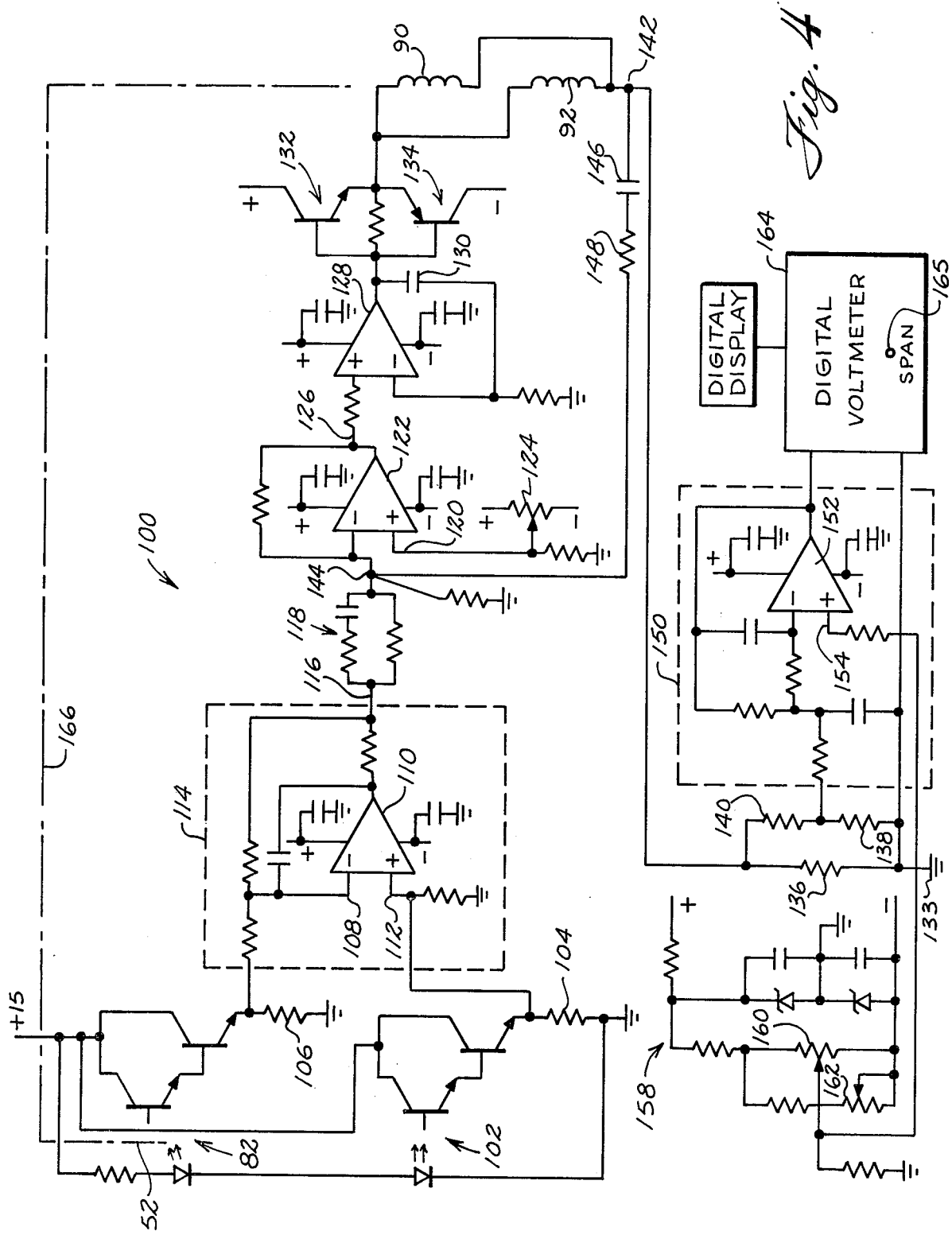
FIG. 4 is a schematic showing the circuitry of the electrical servo-system for restoring the beam to null.

Referring now to the drawings and particularly to FIG. 1, there is shown diagramatically, weighing device 10, according to this invention. As shown, weighing device 10 includes a pan or load support 12 mounted on a rigid arm structure 14 which is generally of L-shape, and is connected to a horizontal bar 16. Vertically above bar 16 is a bar 18 secured to the end 20 of a balance beam 22. A cross-flexure pivot including bands 24 and 26 pivotally connect bar 16 to bar 18 at the end 20 of the balance beam.

Beam 22 is mounted on horizontal bar 30 which is suspended from short support bars 32 by cross-flexures 34, 36. Bars 32 are secured to the frame or casing of the weighing device. The beam 22 is elongated in a direction toward its end 38. Adjacent end 38 of the beam is a magnet assembly 40 which includes a coil assembly 42 secured to the beam by a screw 44. The magnet assembly also includes a permanent magnet 46, and a magnetic material pole piece ring 48 concentric with the magnet. Both magnet 46 and ring 48 are mounted on non-magnetic material so that the magnet is magnetically insulated from the ring, and the only flux path is through the annular air gap 50 between the ring and magnet, this air gap being occupied by coil assembly 42.

At the end 38 of the beam there is also a flag or vane 52 which is disposed in the path of travel of light from a light source 54 to a light sensing device 56. This vane and optical detector arrangement determine the null position of the beam. The light source can be a Light Emitting Diode and sensing device can be a photo-transistor, commercially available as a photocoupler.

Projecting downwardly from bar 16 is a rigid leg 60 rigid with the bar and weigh pan support arm 14. Connected between the lower end of leg 60 and the weighing device frame is a stabilizing flexure 62 with an opening at each end. The stabilizing flexure is secured to the lower end of arm 60 by a screw with an enlarged head so that the end of the flexure is clamped securely to the lower portion of the arm. At its other end, a screw 63 with an enlarged head clamps the flexure 62 to the bracket 64 connected to the bottom wall 66 of the casing or housing of the weighing device.

As shown at FIG. 1, bracket 64 is made from sheet metal which is relatively rigid, and has its end 67 secured to the bottom of the case by rivets or screws 68. Bracket 64 has an intermediate portion somewhat longer than the length of flexure 62, and has a stud 70 secured to and projecting upwardly from adjacent its second end 69. This stud extends upwardly through an opening in bottom wall 66 and has nuts 71 and 72 threaded thereon both above and below the bottom wall 66 of the casing. This bottom wall is rigid so that adjusting nuts 71 and 72 causes end 69 of the bracket to be adjusted vertically. Such vertical adjustment of the bracket is permitted by some flexibility in the bracket adjacent its end 67. Since flexure 62 is secured to bracket 64, adjusting the bracket end vertically also adjusts the end of the flexure which is secured to the bracket by screw 63. This arrangement provides for adjusting the position of flexure 62 so that its pivot regions form a parallelogram with the axes 73, 74 of the cross-flexure pivots.

While there is only minimal pivotal movement of the weighing beam and only minimal pivotal movement along the stabilizing flexure 62, there is some minute movement during a weighing operation. Whatever movement does occur, occurs at the axes designated 73, 74 and regions 76 and 78 of flexure 62. Axes 73 and 74 are at the cross points of the respective cross-flexures. Axes 76 and 78 are along the length of stabilizing flexure 62 at locations close to but spaced from the respective ends of the flexure. Pivotal movement at the stabilizing flexure is believed to cause the flexure to bend very slightly between its fixed ends.

This pivot system operates in the manner of a Roberval linkage, and it will be observed that weigh pan 12 is so positioned and dimensioned with respect to stabilizing flexure 62, axis 73, and arm 60, that any weight placed on the pan will maintain the stabilizing flexure in tension. By virtue of this arrangement, the weight determined by the balance is the same regardless of the position of the weight on the pan.

When properly adjusted for use, pivots 73, 74, 76 and 78 form four corners of a parallelogram with the result that the Roberval arrangement is obtained.

Suitable adjustable stops 79 are provided to limit the extent of deflection of end 38 of the balance beam. In practice, these stops are set so that the maximum deflection of the beam is on the order of 10 thousandths of an inch. While such stops are used, it has been found that the tracking of the servo system which operates the restoring arrangement, follows the application of a weight to pan 12 so closely, that the stops never engage the beam during normal weighing. Because of the multiplication factor of the beam arm from end 38 of the beam, with respect to the shorter distance between pivots 73 and 74, the deflection of the weigh pan, during operation, is perhaps 0.0001 to 0.0005 inches. More significantly, the extent of angular deflection at the respective pivots 73, 74, 76, and 78 is only on the order of several seconds angular displacement. This minute angular deflection is quite significant to the accuracy of this weighing device, since any significant angular displacement could shift the pivot axes of the cross-flexure pivots 73 and 74, as well as the location of the pivot regions 76 and 78 of the stabilizing flexure. By maintaining the deflection minute, there is no shifting or changing of the axes and thus the parallelogram arrangement is maintained. In addition, because the deflections are minute, no spring hysteresis occurs in normal operation, which could cause inaccuracy.

Restoration of the balance to its null position occurs as a result of the action of magnet assembly 40, and as will soon be explained, the restoring force of the magnet assembly is linear with respect to its energizing current.

Mounted on ring 48 of the magnet assembly is a bracket 80. Secured to bracket 80 is a photo-coupler 82 which can be a General Electric H13B1, having as a light source, an LED 81 which directs light toward a photo-transistor 83. There is a space 84 between the LED and the photo-transistor, and the vane 52 mounted on end 38 of beam 22 extends into the space. A screw 85 mounts bracket 80 for vertical adjustment so that the height of the photo-coupler can be adjusted. Such adjustment provides for moving the null position of the end 38 of the beam, and thus permits adjusting the position of coil assembly 42 with respect to magnet 46 and 48, so a truly linear relationship can be established between the coil assembly and the magnet and ring. As is apparent, coil assembly 42 need have linear characteristics with respect to the magnet and ring only to the extent of movement of the coil during normal weighing. Since the deflection is very minute, being only that required to produce an error signal for the servo system to track, only a small range of linearity is required. The linearity here referred to is the linearity between the force produced by a current in the restoring coil and the energizing current.

A relatively inexpensive system, linear within its range of movement will now be described.

Magnet 46 is cylindrical and is axially magnetized so its upper end is North and its lower end is South. The magnet is mounted on a spacer 49 of non-magnetic material fixed to bottom wall 66. Ring 48, which is axially elongated, is mounted on an annular spacer 51, fixed to wall 66 and which is also of non-magnetic material. The spacers provide a space 53 between the lower end of the magnet and ring into which the coil assembly can move.

Coil assembly 42 includes a coil form 88 of non-magnetic material on which two axially spaced coils 90 and 92 are wound. The coils are connected in parallel but can be connected in series. The parallel connection is preferred. The coils are so wound and connected that when energized with current of one polarity, an upward restoring force is produced by both coils, and when energized with a current of the other polarity, a downward restoring force is produced by both coils. Coil form 88 has a length approximately the same as the ring 48, and the coils 90 and 92 are each wound close to the respective ends of the coil form. The coils each have a length of about one-third the length of the coil form, with a space 94 between the coils.

An unbalance weight 96 to create unbalance of about one-half the range of weighing device 10, is secured to end 38 of beam 22. Because of the 6:1 multiplication factor of the beam, weight 96 is approximately one-sixth the upward force on pan 12 which is required to create the same unbalance. For example, where the weighing device 10 has a capacity of 1,000 grams, weight 96 will require a 500 gram weight on the pan to balance the beam. The advantage of this initial unbalance will soon be apparent.

The electrical circuit arrangement for restoring the beam to null, and for providing a digital readout of the weight placed on pan 12 will now be described. Circuit 100 includes solid state components of high reliability.

Circuit 100 includes two phototransistor-light emitting diode units 82 and 102, each of which can be a model H 13B1, available from General Electric Co. Unit 82 is used as a sensing unit whereas unit 102 is used as a reference unit. The unit 102 is maintained in an enclosure close to unit 82, and provides a reference signal to compensate for changes in the characteristics of the units due to aging, and temperature and power supply variations. Resistor 104 has a resistance one half the resistance of the resistor 106 so that the signal at input 108 of operational amplier 110 is positive with respect to the signal at input 112. The circuitry 114 associated with this operational amplifier is such that the amplifier performs a mixing function and has a gain of unity.

The output signal on line 116 is differentiated by a differentiator circuit 118 connected to an operational amplifier with associated circuitry to provide a gain of 10. A reference voltage is provided at input 120 of amplifier 122 by a voltage divider including a variable resistor 124.

The output signal on line 126 is to an amplifier 128. The circuitry at amplier 128 includes a capacitor 130, which stores the signal from this amplifer. The stored signal on capacitor 130 goes to a pair of power transistors connected in a push-pull configuration where transistor 132 is NPN, and transistor 134 is PNP. The output current from the transistors is through restoring coils 90 and 92 to ground 133.

Between coils 90, 92, and ground is a load resistor 136 is parallel with divider resistors 138, 140. Connected between junction 142 at the coils, and a junction 144 between differentiator circuit 118 and amplifier 122 is a feedback loop have a series connected capacitor 146 and a resistor 148. This feedback loop cancels some of the delay of the circuit caused by capacitor 130.

The signal appearing across resistor 138 is proportional to the energizing current in the restoring coils 90, 92. However, since the current through the coils can be negative or positive, since the system is a true servo system, it is desirable to shift the signal appearing at resistor 138 so the resulting signal is always of the same polarity. Circuit 150 both filters this signal and shifts same so the output from amplifier 152 is always negative. This is accomplished by providing a reference voltage at the terminal 154 of the operational amplifier 152. The reference voltage is obtained from a reference voltage circuit 158 via potentiometers 160 and 162. Potentiometer 160 is a coarse zero adjust, and potentiometer 162 provides fine zero adjust. The operator of the weighing device has acces to both these potentiometers via suitable knobs on the balance. Potentiometer 160 can also be used with potentiometer 162 for tare adjustment preferable up to 40% of the range of the balance.

Circuit 150 has its output connected to digital converter which includes suitable circuitry to operate a display device. Since the output from voltage from circuit 150 is always zero or negative, the converter and display device can be a conventional digital voltmeter 164, preferably one with a span or range control 165 for purposes of calibration.

The dot-dash line from coils 90, 92, to vane 52 represents mechanical feed-back from the coils which are mechanically connected to the beam, to the vane 52 which is also on the beam and moves in response to the restoring force of the coils.

Adjusting screws 170 are provided between bar 18 and a vertical face 172 of beam 22, adjacent end 20 to permit adjusting the axis of the cross flexure pairs 24, 26, with respect to the axis of cross flexure pairs 34, 36. This arrangement permits adjusting the pivot axis 73 so it is parallel with pivot axis 74. To obtain the parallel linkage arrangement previously mentioned, stud 70 is adjusted by manipulating nuts 71 and 72 to adjust end 69 of stabilizing flexure vertically. These adjustments are all made during manufacture and do not require readjustment in normal use.

Cross flexures 24, 26, 34, and 36, are each metal bands which can be about 3/16 inch wide and from 0.01 to 0.04 inches thick. Stabilizing flexure 62 can be ¼ inch wide and of a thickness in the range of 0.02 to 0.05 inches, although these dimensions will vary with the balance. The cross flexures are secured to the bars with screws.

In use a calibration step is first performed. With no weight on pan 12, pots 160 and 162 are adjusted so the display indicates zero. Then, a weight equal to the capacity of the balance is placed on the pan, and the span control knob is adjusted to display the capacity of the balance, for example, 1,000 grams. The balance is now calibrated for operation, and is quite accurate.

With no weight on pan 12, beam 22 is unbalanced by weight 96, by an amount approximately equal to one-half the range of the balance. Such unbalance is sensed by sensing unit 82, because vane 52 is below the null position. The signal from sensing unit 82, of servo circuit 100, causes the circuit to energize coils 90, 92, to life beam 22 to its null or balance condition. When beam 22 is below null the signal at the output of amplifier 128 is negative, and transistor 134 conducts so the energizing current is negative with respect to ground in coils 90, 92. The servo action of the system is such that it tracks the vane and the beam at a rapid rate, so beam deflection rarely occurs.

When the weight on pan 12 precisely balances the initial unbalance of weight 96, the beam is in balance and no restoring force is required. At this condition the output of amplifier 128 is zero, and the current in coils 90, 92 is zero, since no restoring force is required.

When the weight on pan 12 is greater than the unbalance of weight 96, the beam is above the null condition and a downward force is required from coils 90, 92, at end 38 of the beam to restore the beam to null. In this state where the vane 52 is above the null position, the output current from amplifier 128 is negative and the restoring coils are energized with current positive with respect to ground. Suchn energization causes the desired downward restoring force.

Since circuit 100 is a true servo system, and since the electro-magnet 40 has linear restoring force-current characteristics, the voltage across load resistor 138 is linear with respect to the load and so is the shifted signal at the output of circuit 150.

Since the force produced by a coil depends on the energizing current, and since the power and heating resulting from energizing a coil varies as the square of the energizing current, the required current in this bi-polar system for restoration to null of a full range load is one-half the current required to restore the beam to null as compared with a balance of the same range, but without the initial unbalance of weight 96. Hence, heating at full scale is less by a factor of four (current squared) than in an arrangement without the initial unbalance.

While a preferred embodiment has been shown and described, numerous changes can be made without departing from the scope of the invention.

What is claimed is:

1. A load compensated weighing device comprising
load support means for supporting a load to be weighed;
means for unbalancing the load support means at a no-load condition to create an initial unbalance so that a restoring force is required at the no-load condition to restore the support to a null condition;
electro-magnetic restoring means for restoring the load support means to its null condition;
means responsive to unbalance of the support means for sensing the unbalance;
means responsive to the initial unbalance of the support means for energizing the restoring electro-magnetic means with current of a first polarity, to null the initial unbalance; and
means responsive to an unbalance opposing the initial unbalance and greater than the extent of the initial unbalance for energizing said electro-magnetic means with a current of a polarity different from said first polarity, so that the extent of heating resulting from energizing said electro-magnetic means is smaller by a factor substantially greater than one than the heating where the polarity of the current is always the same and there is no initial unbalance.

2. A weighing device according to claim 1 wherein said means for unbalancing the load support means at a no-load condition comprises
a weight of a mass substantially equal to one half the weighing capacity of the weighing device.

3. A weighing device according to claim 1 wherein the electro-magnetic restoring means comprises
a non-magnetic support,
a first coil on the support, and
a second coil on the support; and
means for establishing a flux field in the region of said coils.

4. A weighing device according to claim 1 wherein said load support means comprises a pan pivotally connected to a pivoted balance beam; and
said electro-magnetic restoring means is mounted on said balance beam.

5. A weighing device according to claim 3 wherein said means for establishing said flux field comprises
a magnet,
magnetic material means in spaced relation to said magnet, and
non-magnetic support means magnetically insulating said magnet from said magnetic material means.

6. A weighing device according to claim 4 wherein said pan is pivotally connected to said balance beam by a cross-flexure pivot;
said balance beam is pivotally connected to the weighing device by a cross-flexure pivot;
said pan is connected to a stabilizing flexure spaced from and generally parallel with the plane of the pivot axes of the cross-flexure pivots.

7. A load compensated weighing device comprising
load support means for supporting a load to be weighed;
means for unbalancing the load support means at a no-load condition to create an initial unbalance so that a restoring force is required at the no-load condition to restore the support to a null condition;
electro-magnetic means for restoring said load support to a null position, and comprising
a first coil, and
a second coil
means responsive to said initial unbalance of the load support for energizing said first coil with a current to create a restoring force to move the load support to a null position in opposition to the direction of the initial unbalance; and
means responsive to unbalance of said load support in a direction opposite to the initial unbalance to energize one of said coils to create a restoring force acting in the direction of the initial unbalance to move the load support to a null position.

8. A weighing device according to claim 7 wherein said first and second coils are connected in series, and energized simultaneously to produce said force acting in opposition to the direction of the initial unbalance, and to produce said force acting in the direction of the initial unbalance.

9. A weighing device according to claim 7 wherein said coils are connected in parallel to produce said force acting in opposition to the direction of the initial unbalance, and to produce said force acting in the direction of the initial unbalance.

10. A weighing device according to claim 7 wherein said coils are energized with current of one polarity to produce said force acting in opposition to the direction of the initial unbalance; and
said coils are energized with current of a different polarity from said one polarity to produce the force acting in the direction of the initial unbalance.

11. A weighing device according to claim 7 wherein said electro-magnetic means further includes means for producing magnetic flux, and comprising
a magnet core,
a magnetic material ring generally surrounding said core,
non-magnetic support means mounting said magnet with respect to said magnetic material means;
mounting means mounting said first and second coils respectively adjacent the respective ends of said magnet and said magnetic material means.

12. A load compensated weighing device comprising, in combination
a frame;
a balance beam;
cross-flexure pivot means mounting said beam on said frame for pivotal movement in a first region;
a weight receiving pan;
a support structure secured to said pan;
second cross-flexure pivot means pivotally connecting said balance beam to said support structure of said weigh pan for pivotal movement in a second region;
a stabilizing arm rigid with said weigh pan support structure and projecting away from the plane of the pivot axes of said first and said second cross-flexure pivot means;
a stabilizing flexure connected between said stabilizing arm and said frame;
said stabilizing flexure defining third and fourth regions of pivotal movement;
means for adjusting the stabilizing flexure with respect to said frame; and
means responsive to an unbalance of said beam for restoring the beam to a null condition.

13. A weighing device according to claim 12 which further includes
means for adjusting the parallelism of one of said first and second cross-flexure pivot means with respect to the other.

14. A weighing device according to claim 12 wherein said stabilizing flexure is a narrow tension band;
said first, second, third and fourth regions of pivotal movement lie along legs of a parallelogram; and
said weigh pan and second pivot means are so disposed with respect to said stabilizing flexure that said flexure is maintained in tension, irrespective of the position of a load on said pan.

15. A weighing device according to claim 12 wherein said means for restoring said beam to a null position includes a magnet assembly comprising
a magnet on said frame,
a magnetic material member on said frame in spaced relation to said magnet,
non-magnetic means supporting said member with respect to said magnet, and
a coil assembly between said magnet and pole piece.

16. A weighing device according to claim 12 wherein said first and second cross-flexure pivot means each comprise
first and second thin flexible bands extending crosswise to each other, and
third and fourth thin flexible bands extending crosswise to each other and spaced from said first and second flexible bands.

17. A weighing device according to claim 16 wherein said first cross-flexure pivot means mounts said beam for pivotal movement about a first axis which can shift laterally, in response to displacement of the beam from its null condition;
said second cross-flexure pivot means mounts said support structure of the weigh pan for pivotal movement about a second axis parallel to the first axis and which can shift laterally in response to displacement of the beam from its null condition; and
said means for restoring the beam to a null condition includes
means for restoring the beam to essentially the same null position in response to unbalance of the beam by different loads, so that said first and second predetermined axes are always in the same positions at said null position of the beam.

18. A weighing device according to claim 12 wherein said means for adjusting the stabilizing flexure comprises
means for adjusting one end of the stabilizing flexure with respect to the frame.

19. A weighing device according to claim 18 wherein said stabilizing arm porjects downwardly with respect to said second cross-flexure pivot means.

* * * * *